(12) United States Patent
Yates et al.

(10) Patent No.: US 10,138,816 B2
(45) Date of Patent: Nov. 27, 2018

(54) FUEL PUMPING UNIT

(71) Applicant: ROLLS-ROYCE, PLC, London (GB)

(72) Inventors: Martin Yates, Derby (GB); Mihir Desai, Derby (GB)

(73) Assignee: ROLLS-ROYCE PLC, London (GB)

( * ) Notice: Subject to any disclaimer, the term of this patent is extended or adjusted under 35 U.S.C. 154(b) by 416 days.

(21) Appl. No.: 14/858,614

(22) Filed: Sep. 18, 2015

(65) Prior Publication Data
US 2016/0146108 A1     May 26, 2016

(30) Foreign Application Priority Data
Nov. 20, 2014 (GB) .................................. 1420635.3

(51) Int. Cl.
| | |
|---|---|
| F02C 7/236 | (2006.01) |
| F04B 49/035 | (2006.01) |
| F04B 23/14 | (2006.01) |
| F04B 17/05 | (2006.01) |
| F04D 15/00 | (2006.01) |
| F04D 1/10 | (2006.01) |
| F04B 23/12 | (2006.01) |

(Continued)

(52) U.S. Cl.
CPC .............. *F02C 7/236* (2013.01); *F04B 17/05* (2013.01); *F04B 23/12* (2013.01); *F04B 23/14* (2013.01); *F04B 41/06* (2013.01); *F04B 49/035* (2013.01); *F04D 1/10* (2013.01); *F04D 9/04* (2013.01); *F04D 13/12* (2013.01); *F04D 15/0011* (2013.01); *F04C 2/10* (2013.01); *F04C 2/344* (2013.01); *F04C 11/006* (2013.01); *F04C 2210/1044* (2013.01); *F05D 2220/323* (2013.01)

(58) Field of Classification Search
CPC .................... F04C 7/236; F04C 11/006; F04C 2210/1044; F04C 7/22; F04D 1/06; F04D 1/10; F04D 13/00; F04D 9/04; F04D 9/044; F04D 13/12–13/14; F04D 15/0005–15/0011; F04D 15/0072; F04B 17/05; F04B 23/04; F04B 23/08; F04B 23/12–23/14; F04B 49/03–49/035
USPC ................... 60/734; 417/201, 203, 205, 248, 417/250–253, 286, 287, 428
See application file for complete search history.

(56) References Cited

U.S. PATENT DOCUMENTS 3,147,712 A * 9/1964 Gaubatz .................. F02C 7/236
137/565.33
3,183,838 A * 5/1965 Englesson ............... F04D 13/14
415/151

(Continued)

FOREIGN PATENT DOCUMENTS

EP     0657651 A1   6/1995
GB     667022 A     2/1952
(Continued)

*Primary Examiner* — Alexander Comley
(74) *Attorney, Agent, or Firm* — Oliff PLC

(57) ABSTRACT

A fuel pumping unit has a low pressure centrifugal pump and a high pressure centrifugal pump. In use, the low pressure pump supplies fuel at a boosted pressure to the high pressure pump for onward supply to a fuel metering unit. The pumping unit further has a drive input which drives the low and high pressure pumps. A gear arrangement is operatively located between the drive input and the low and high pressure pumps such that the low and high pressure pumps are driven at different speeds by the drive input.

8 Claims, 5 Drawing Sheets

(51) Int. Cl.
  *F04B 41/06* (2006.01)
  *F04D 13/12* (2006.01)
  *F04D 9/04* (2006.01)
  F04C 2/10 (2006.01)
  F04C 2/344 (2006.01)
  F04C 11/00 (2006.01)

(56) References Cited

U.S. PATENT DOCUMENTS

| | | |
|---|---|---|
| 3,614,269 A | 10/1971 | Lanctot |
| 6,447,262 B1 * | 9/2002 | Clements ............ F04D 15/0072 |
| | | 417/244 |
| 2008/0028742 A1 | 2/2008 | Parsons |
| 2014/0196463 A1 * | 7/2014 | Zielinski ................ F02C 7/236 |
| | | 60/772 |

FOREIGN PATENT DOCUMENTS

| | | | |
|---|---|---|---|
| GB | 1281362 A | 7/1972 | |
| GB | 2021693 A | * 12/1979 | ............... F04D 1/06 |

* cited by examiner

FUEL PUMPING UNIT

FIELD OF THE INVENTION

The present invention relates to a fuel pumping unit, for example for supplying fuel to an aero-engine.

BACKGROUND OF THE INVENTION

A typical fuel pumping system for an aero-engine comprises a low pressure (LP) pumping stage operable to draw fuel from a fuel tank, and supplying the fuel at boosted pressure to the inlet of a high pressure (HP) pumping stage. The inter-stage flow between LP and HP pumping stages is typically used to cool engine lubrication oil in a fuel/oil heat exchanger.

Commonly, the LP pumping stage comprises a centrifugal impeller pump whilst the HP pumping stage comprises a positive displacement pump in the form of a twin pinion gear pump.

However, another option is to use two centrifugal stages in series. For example, EP A 0657651 describes an arrangement in which a first centrifugal pump acts as the LP stage, and a second centrifugal pump acts as the HP stage, the two pumps being cantilever-mounted to respective ends of a journal shaft driven by a drive shaft.

SUMMARY OF THE INVENTION

The efficiencies of centrifugal pumps typically vary with rotational speed, and a problem with the arrangement of EP A 0657651 is that the two pumps operate at the same speed, making it difficult to operate both pumps efficiently.

Accordingly, in a first aspect the present invention provides fuel pumping unit having a low pressure centrifugal pump and a high pressure centrifugal pump, in use, the low pressure pump supplying fuel at a boosted pressure to the high pressure pump for onward supply to a fuel metering unit;

wherein the pumping unit further has a drive input which drives the low and high pressure pumps, a gear arrangement being operatively located between the drive input and the low and high pressure pumps such that the low and high pressure pumps are driven at different speeds by the drive input.

Advantageously, the gear arrangement allows the low and high pressure pumps to be driven at different speeds, thereby improving pump efficiencies, while still allowing a single drive input to operate both pumps. In addition, the low pressure pump can be run at a slow enough speed to operate with low inlet pressures and to handle multiphase (e.g. air/fuel) flows, while the high pressure pump can be run at high speeds enabling it to be reduced in size and weight.

The fuel pumping unit of the first aspect may be suitable for pumping fuel for an aero-engine, such as a gas turbine engine. Thus the drive input may be a drive from an aero-engine accessory gearbox. Indeed, in a second aspect, the present invention provides an aero-engine having the fuel pumping unit of the first aspect.

Optional features of the invention will now be set out. These are applicable singly or in any combination with any aspect of the invention.

Conveniently, the high pressure pump can be driven at a higher speed than the low pressure pump.

The gear arrangement may include a bevel gear drive. For example, a bevel gear may be located at an end of the drive input. The low and high pressure pumps may have respective impellers mounted on respective shafts. The impeller shafts can then terminate in further bevel gears which mesh with the bevel gear at the end of the drive input. The relative speed of each impeller can be determined by suitable selection of its further bevel gear.

The fuel pumping unit may further have an axial flow inducer, e.g. of propeller type, at the inlet to the low pressure pump.

The low and high pressure pumps may be supported on journal or rolling element (e.g. ball or roller) bearings. Journal bearings may be fuel lubricated. Rolling element bearings may be oil lubricated.

The axes of the low and high pressure pumps may be inclined relative to each other. For example, when the low and high pressure have respective impellers mounted on respective shafts, these shafts may be inclined relative to each other. This can facilitate a more compact envelope for the fuel pumping unit.

The fuel pumping unit may further have a selector valve which is configured to selectably provide a high pressure mode and a low pressure mode, wherein: in the high pressure mode the low pressure pump supplies fuel at the boosted pressure to the high pressure pump for onward supply to the fuel metering unit; and in the low pressure mode the fuel supply from the low pressure pump to the high pressure pump is shut off such that the high pressure pump runs dry and the low pressure pump supplies fuel to the fuel metering unit. Thus, the high pressure pump can be run on air when the additional pressure rise it produces is not required, e.g. at low engine power settings. In particular, at low speeds the efficiency of the high pressure pump can be very low. Therefore, if it is not run on air, it may cause high fuel temperatures, which in turn can limit the heat sink capability of the fuel to cool engine oil.

When the fuel pumping unit has the selector valve, it may further have a positive displacement start pump which is driven by the drive input via the gear arrangement, the selector valve being further configured to selectably provide a start mode, wherein: in the start mode the low pressure pump supplies fuel at the boosted pressure to the start pump for onward supply to the fuel metering unit, and the fuel supply from the low pressure pump to the high pressure pump is shut off such that the high pressure pump runs dry. Such an arrangement allows the pump unit to better supply sufficient pressure rise at low speed starts, e.g. at the low windmill relight speeds prevalent on modern high bypass turbofan engines. The start pump can also help to prime the centrifugal pumps should significant amounts of air have entered the centrifugal pumps. In the high and low pressure modes, rather than the selector valve having further complexity to isolate the start pump, the start pump can recirculate fuel between the start pump and the selector valve. This recirculation can be at a low pressure rise to reduce any fuel temperature increase in the start pump. The start pump is a positive displacement pump such as, an external gear, a gerator or a vane pump. In particular, it may be a vane pump such as a dual lobe vane pump. Conveniently, the low pressure pump and the start pump may be driven at the same speed by the drive input. For example, they may be mounted on a common shaft.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
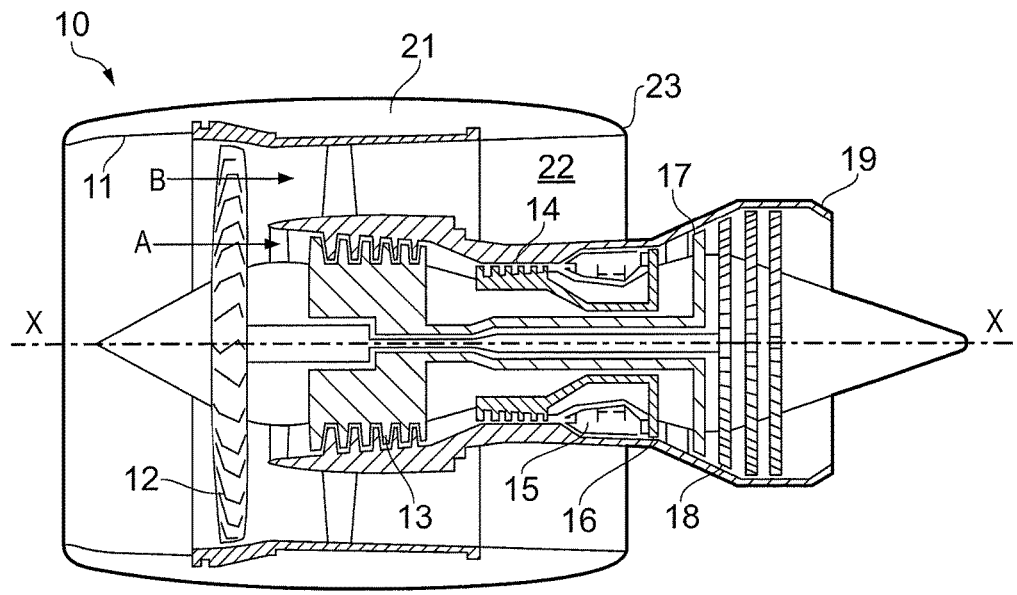
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine has a fuel pumping unit (not shown in FIG. 1) which draws fuel from a fuel tank, and supplies pressurised fuel to a fuel metering unit of the engine. The metered fuel is then sent to the burners of the combustion equipment 15.

Typical aero engine operating conditions result in low specific speeds, $N_s$:

$$N_s = \frac{N \cdot \sqrt{Q}}{(\Delta p / \rho \cdot g)^{0.75}}$$

where N is pump speed, Q is volume flow rate, Δp is pump pressure rise, ρ is density, and g is acceleration due to gravity. US units of specific speed use flow in US Gallons per minute (USGPM), speed in revolutions per minute (RPM), and pressure rise in pounds square inch (psi). These units and flow rates in Imperial Gallons per hour (IGPH) are used in following graphs and the discussion below.

In general, pump efficiencies increase as the specific speed increases, up to a maximum which can then be followed by a decrease in efficiency. For a typical medium/large engine application, if a single stage centrifugal pump were to be used in the fuel pumping unit the pump would have a low specific speed of less than 200 in US units, which would result in very low overall efficiencies. These low efficiencies would result in significant heat being rejected into the fuel and hence high fuel temperature rises, particularly at low engine power settings. High fuel temperatures limit the heat sink capability of the fuel for cooling the engine oil.

However, by using a pump unit which has two centrifugal stages in series, the specific speed of each stage can be increased as the pressure rise each is required to produce can be reduced, and hence the efficiency of each stage can be improved.

In a two stage pump unit, the first (LP) stage can thus be run at a speed that allows it to meet the low inlet pressure and multiphase flow (V/L) requirements when airframe fuel pumps are inoperative. In particular, the first stage pump can be arranged to generate the required pressure rise for engine power settings below cruise. For a modern engine with staged combustion this is around 500 psi.

The second (HP) stage is fed with boosted pressure fuel from the first stage and so it can be run at a higher speed, which is desirable for the reduction of its size and weight. This can also increase the specific speed of the second stage, which in turn increases its efficiency. The second stage can be sized to generate the balance of the pressure rise required at high engine power levels. For a modern system, with staged combustion, the second stage would be required to generate about 1500 psi at take-off flows. The total pressure rise of the pump unit at take-off would therefore be around 2000 psi.

Accordingly, the pump unit is arranged so that the first and second stages operate at different speeds. In the embodiments of the invention discussed in detail below, this can be achieved with a single input drive shaft from the engine accessory gearbox.

At low engine power conditions, the efficiency of a two stage pump can still be very low and may result in high fuel temperatures which in turn limit the heat sink capability of the fuel to cool the engine oil. Both the pressure rise and input power of a centrifugal pump are proportional to the density of the fluid it is handling. Thus preferably the second stage of the pump unit is run "dry" (i.e. runs in air) at low engine power settings. Since the density of air is much less than the density of fuel, this can significantly reduce the power consumption of the second stage.

Figure 2:
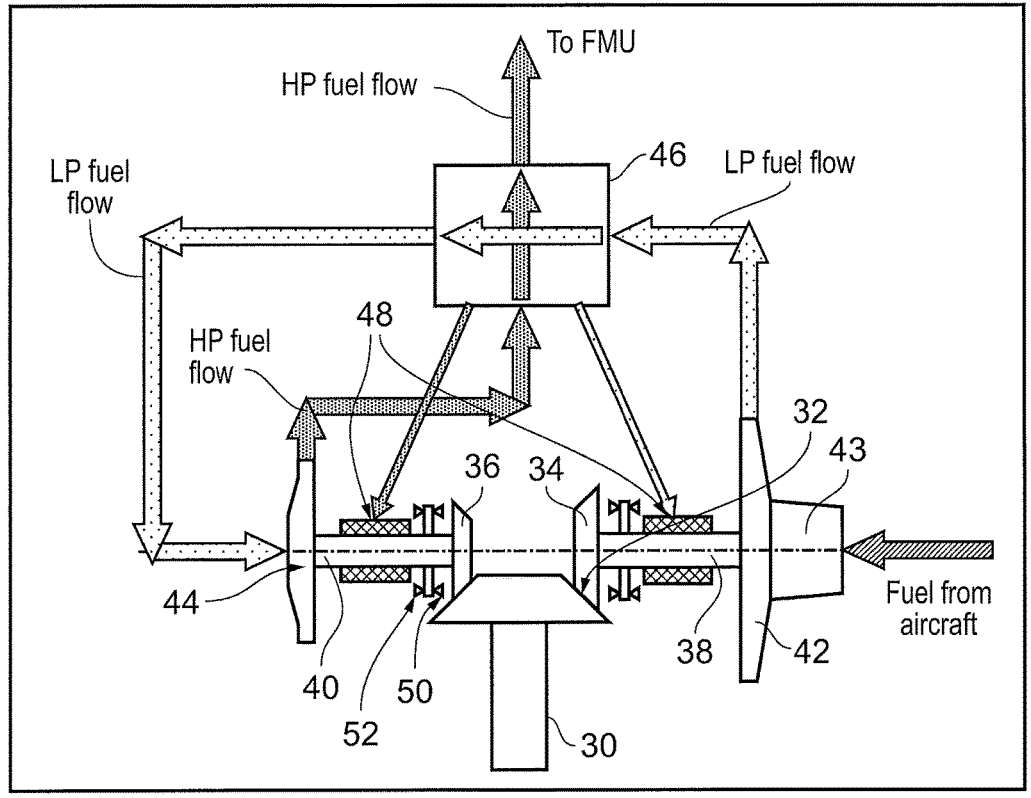
FIG. 2 shows schematically a first embodiment of a fuel pumping unit having first stage (LP) and second stage (HP) centrifugal pumps, the pumping unit being in a high power mode.
Figure 3:
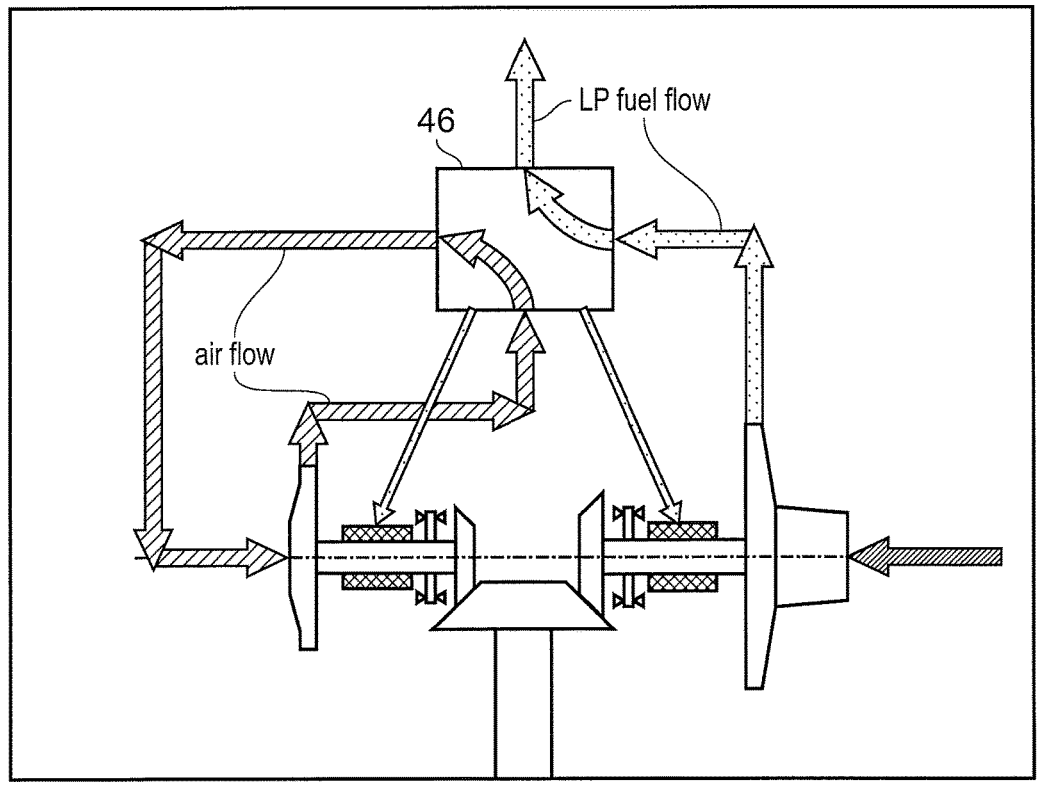
FIG. 3 shows schematically the fuel pumping unit of FIG. 2 in a low power mode.

FIGS. 2 and 3 show schematically a first embodiment of the fuel pumping unit having first stage (LP) and second stage (HP) centrifugal pumps, fuel flows being indicated by thick arrowed lines. A drive input 30 from the engine accessory gearbox terminates in a bevel gear 32. Further bevel gears 34, 36 at the ends of first stage 38 and second stage 40 impeller shafts mesh with the input bevel gear. At the other ends of the impeller shafts are mounted first stage 42 and second stage 44 impellers of respectively the first and second stage centrifugal pumps. The first stage can incorporate an axial flow inducer 43.

Together, the bevel gears 32, 34, 36 form a gear arrangement operatively located between the drive input 30 and the low and high pressure pumps. The first stage bevel gear 34 is larger diameter than the second stage bevel gear 36, making the first stage pump run at a slower speed than the second stage pump. More particularly, the first stage pump can be run at a low speed compatible with the low inlet pressure and multiphase flow that occur when the airframe fuel pumps are inoperative, while the second stage can be run at a higher speed to reduce its size and weight and to increase its specific speed thereby improving its peak efficiency.

A selector valve 46 controls the operational mode of the pumping unit. It also supplies fuel (indicated in FIGS. 2 and 3 by thin arrowed lines) to fuel lubricated journal bearings 48 on which the impeller shafts 38, 40 are mounted. Back-to-back oil 50 and fuel 52 seals with inter-seal drains are positioned between the bearings and the oil-lubricated bevel gears 34, 36 to prevent mingling of fuel with gear lubrication oil. The lubrication oil supply and scavenge can be provided by the accessory gearbox.

The selector valve 46 has a first position which provides a high power mode, illustrated in FIG. 2. In this mode, the valve directs the delivery flow from the first stage to the inlet of the second stage and then directs the delivery flow from the second stage to a fuel metering unit (FMU) of the engine. In a second position, illustrated in FIG. 3, the selector valve provides a low power mode which directs the flow from the first stage directly to the FMU and shuts off fuel to the second stage so that it runs dry. Accumulator chambers, incorporating suitable baffling, may be provided within the valve to attenuate high transient pressures that may occur when the second stage transitions between running on fuel and air and vice-versa. In both modes, the selector valve also directs flow to the pump bearings 48.

The selector valve 46 may be actuated electrically or hydraulically either directly from an engine electronic control (EEC) or from the FMU.

Figure 4:
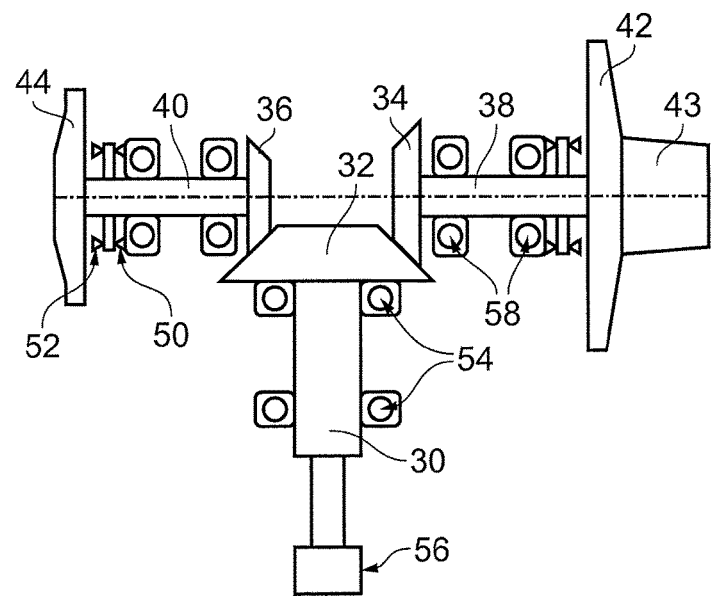
FIG. 4 shows a variant of the fuel pumping unit of FIGS. 2 and 3.

FIG. 4 shows schematically optional variant features of the drive and pumps of the fuel pumping unit of the first embodiment. In particular, oil lubricated rolling element bearings 54 can be used to provide axial and radial load support for the bevel gear shaft 30, the shaft 30 being driven from the accessory gearbox via a splined shaft connection 56 at the outside of a housing of the pumping unit. Additionally or alternatively, the impeller shafts 38, 40 can be provided with axial and radial load support by oil lubricated rolling element bearings 58, with the oil 50 and fuel 52 seals now being positioned between the impellers 42, 44 and the bearings 58. The second stage pump, in particular, may experience high axial loads during the transition from running dry to running with fuel, and hydrostatic axial thrust bearings may be advantageously deployed at this location. For both of these design variations the accessory gearbox can supply and scavenge the oil used to lubricate the rolling element bearings 54, 58.

Figure 5:
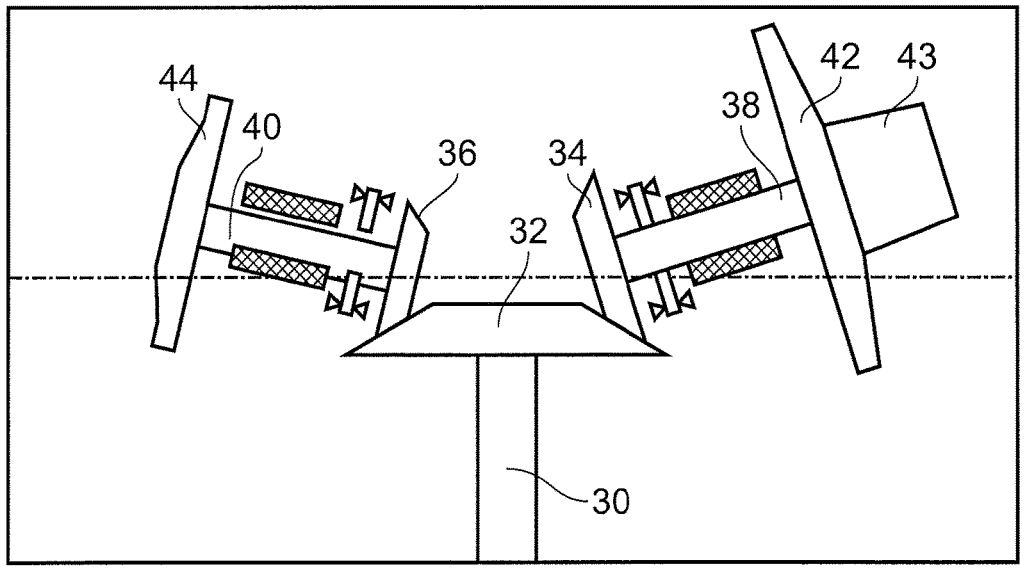
FIG. 5 shows another variant of the fuel pumping unit of FIGS. 2 and 3.

FIG. 5 shows schematically another variant of the drive and pumps of the fuel pumping unit of the first embodiment in which the impeller shafts 38, 40 of the two pumps are inclined with regard to the centreline. This can be beneficial in respect of the overall space envelope of the unit.

Preliminary performance characteristics have been predicted for such an embodiment of an engine-driven two stage centrifugal pumping unit. A take-off flow of 4500 IGPH (Imperial Gallons per hour) and a minimum inlet pressure of TVP (True Vapour Pressure)+3 psi are assumed.

The maximum speed for the first stage pump is 11200 RPM based on the assumption that an axial inducer would achieve a suction specific speed of 20,000 in US units. Such a drive speed is similar to that for a high performance military first stage centrifugal pump. An impeller diameter of around 160 mm would then generate a pressure rise of about 500 psi at the take-off flow.

For the second stage to operate at optimum efficiency would require a speed of about 130,000 RPM. However, the technical risks associated with running a pump at such a high a speed are great. Accordingly a maximum speed of 30,000 RPM is assumed for the second stage pump. At this speed an impeller diameter of less than 110 mm is needed.

Figure 6:
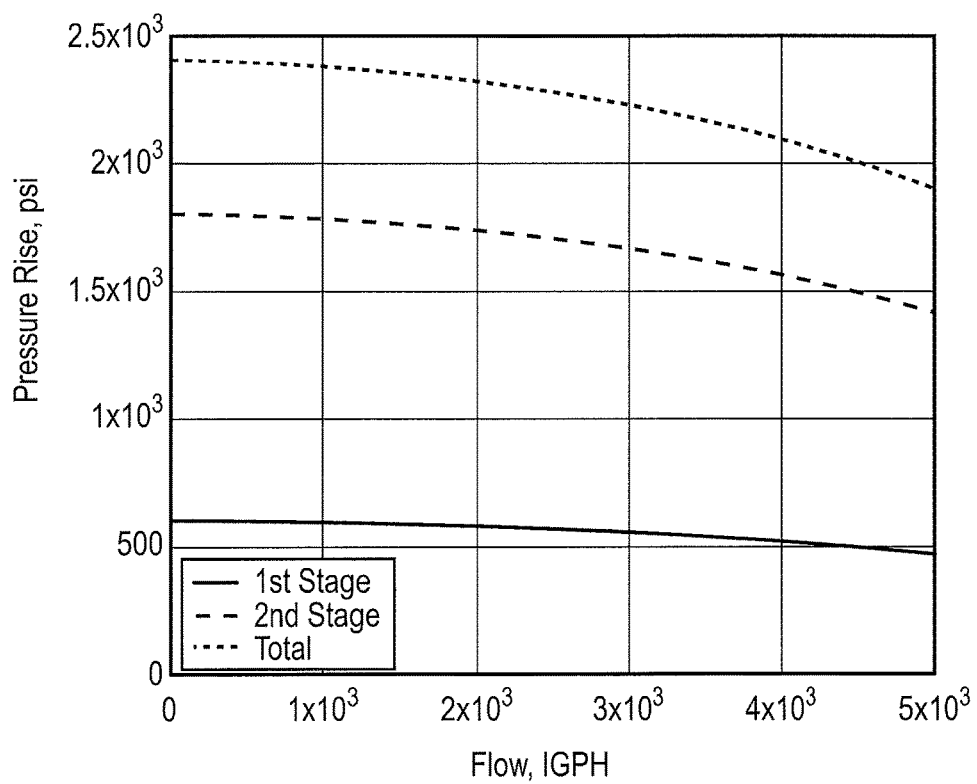
FIG. 6 shows predicted pressure rise characteristics for the fuel pumping unit of FIGS. 2 and 3.
Figure 7:
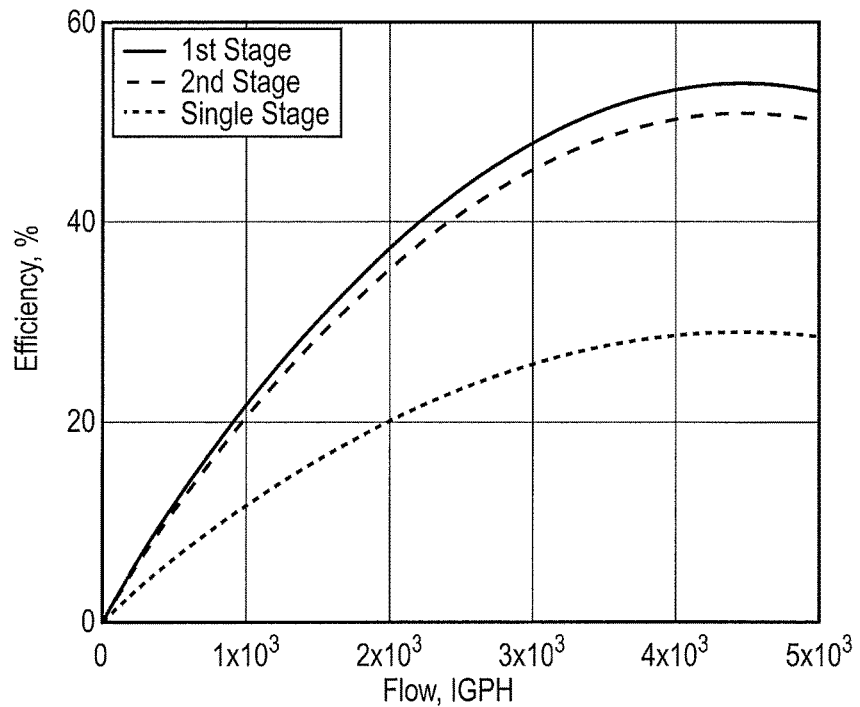
FIG. 7 shows predicted efficiency characteristics for the fuel pumping unit of FIGS. 2 and 3.

The predicted pressure rise and efficiency characteristics for the two stages are shown in FIGS. 6 and FIG. 7 respectively. The efficiency for a single stage centrifugal pump is also shown on FIG. 7 for comparison.

The pump temperature rise was calculated for a cruise condition based on 95% engine speed and a burnt flow of 800 IGPH and for an idle condition based on 65% engine speed and a burnt flow of 100 IGPH. At the cruise condition the adiabatic temperature rise is predicted to be 9.3° C. and at the idle condition around 26° C.

The two stage centrifugal pumping unit thus addresses a number of issues associated with engine driven centrifugal pumps, namely:
  Increasing the efficiency of the pumping unit.
  Reducing the heat rejection to the fuel at low engine power settings.
  Achieving acceptable low inlet pressure performance and reducing unit size and weight with a single drive from the accessory gearbox.

Figure 8:
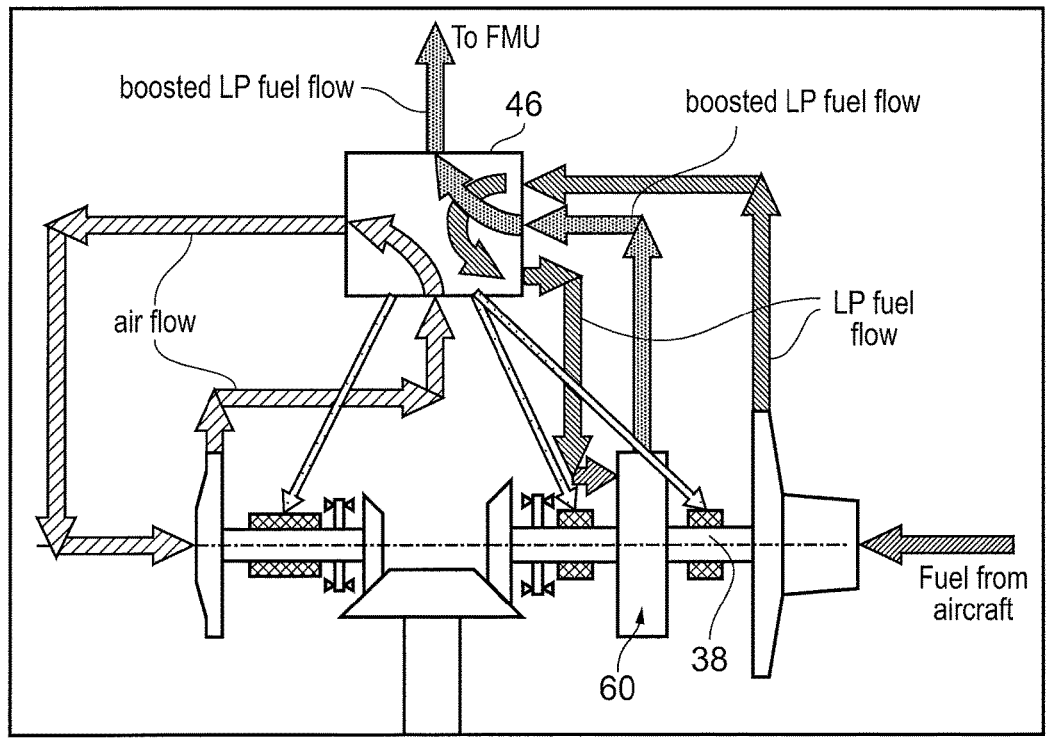
FIG. 8 shows schematically a second embodiment of a fuel pumping unit having first stage (LP) and second stage (HP) centrifugal pumps, the pumping unit being in a start mode.
Figure 9:
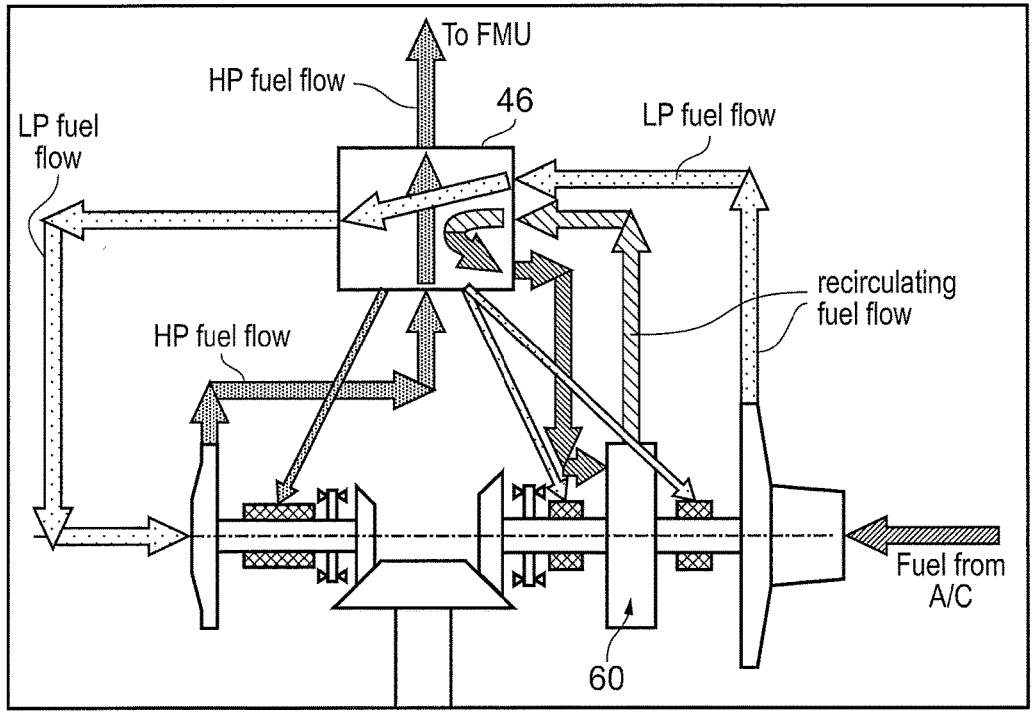
FIG. 9 shows schematically the fuel pumping unit of FIG. 8 in a high power mode.
Figure 10:
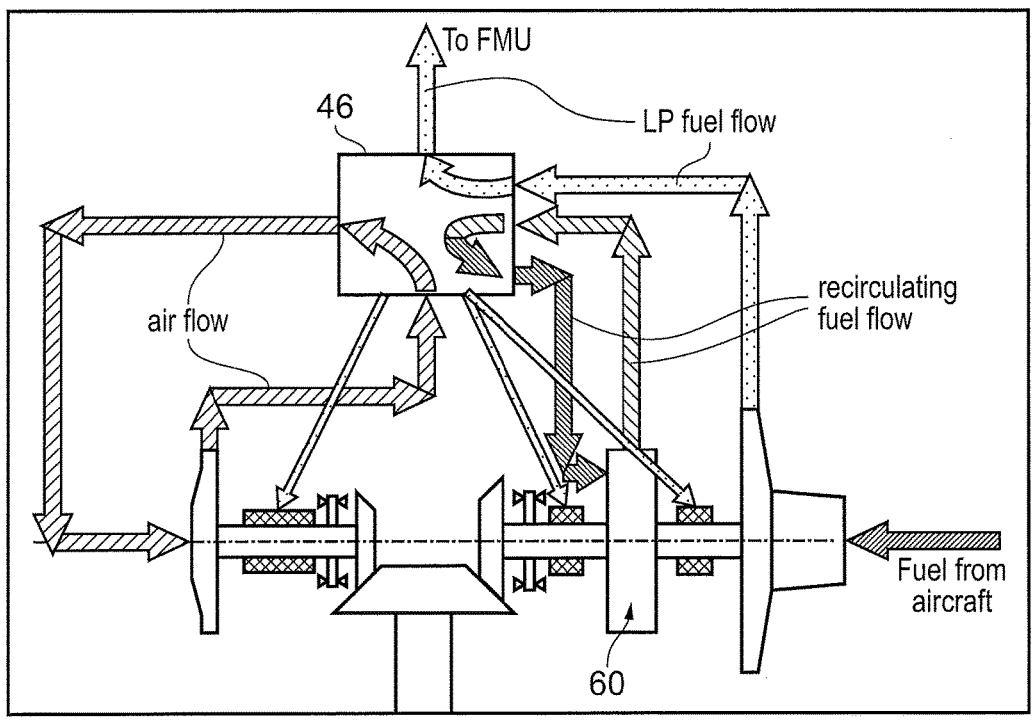
FIG. 10 shows schematically the fuel pumping unit of FIGS. 8 and 9 in a low power mode.

FIGS. 8 to 10 show schematically a second embodiment of the fuel pumping unit.

The pumping unit of the second embodiment has additional features which address:
  Low speed start: Centrifugal pumps typically do not provide enough pressure rise for engine starting; especially at the low windmill relight speeds prevalent on modern high bypass turbofan engines.
  Priming: If significant amounts of air enter a centrifugal pump it may not generate a sufficient pressure rise since the rise is proportional to the density of the fluid being pump. As a consequence, it may not be possible for the pump to dispel the air from the system and re-prime itself.

Accordingly, in the second embodiment, the pumping unit has a positive displacement start pump 60 that can be mounted on the first stage impeller shaft 38 to provide engine starting/priming capability. The selector valve 46 has a third position, illustrated in FIG. 8, which provides a start mode in which the flow output from LP pump is routed to the start pump, and from thence to the FMU and the engine burners at start. At low engine speeds, the first stage pump only generates a very low pressure rise, while in the start mode the second stage pump runs on air to reduce drag and torque. However, even at the low engine speeds, the start pump is able to provide an adequate pressure rise for the fuel sent to the FMU.

As the engine spools up in speed, the selector valve 46 takes the flow output of the start pump 60 and recirculates it back to the start pump inlet at a lower pressure. This is illustrated in FIGS. 9 and 10, which show respectively the high and low pressure modes of the unit. Accordingly, at engines speeds at and above ground idle, the start pump operates at a low back pressure and thus introduces only small parasitic losses into the fuel system.

The start pump 60 also serves to prime the centrifugal pumps. It can be, for example, an external gear, gerotor or vane pump. However, from a size/weight standpoint, a radially balanced (dual lobe) vane pump is particularly advantageous for the following reasons:

Single rotor design.

Radially balanced, hence it can be cantilevered on the LP centrifugal pump bearings, thereby avoiding a need for dedicated bearings for the start pump.

Capability to run at higher speeds.

Over stroking capability can substantially reduce its size and weight. Since the start pump is designed to operate at low pressures (typically 200-300 psid for starting), the vane stroke for a given rotor size can be substantially higher without over stressing the rotor or the vanes.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A fuel pumping unit comprising:
   a low pressure centrifugal pump and a high pressure centrifugal pump, the low pressure centrifugal pump supplying fuel at a boosted pressure to the high pressure centrifugal pump for onward supply to a fuel metering unit;
   a drive input that drives the low pressure centrifugal pump and the high pressure centrifugal pump, the drive input being a single input drive shaft from an engine accessory gearbox;
   a gear arrangement that is operatively located between the drive input and the low pressure centrifugal pump and the high pressure centrifugal pump such that the low pressure centrifugal pump and the high pressure centrifugal pump are driven at different speeds by the drive input;
   a positive displacement start pump that is driven by the drive input via the gear arrangement; and
   a selector valve that is configured to selectably provide a high pressure mode, a low pressure mode, and a start mode,
   wherein:
      in the high pressure mode, the low pressure centrifugal pump supplies fuel at the boosted pressure to the high centrifugal pressure pump for onward supply to the fuel metering unit, the selector valve isolating the start pump or recirculating fuel between the start pump and the selector valve;
      in the low pressure mode, the fuel supply from the low pressure centrifugal pump to the high pressure centrifugal pump is shut off such that the high pressure centrifugal pump runs dry and the low pressure centrifugal pump supplies fuel to the fuel metering unit, the selector valve isolating the start pump or recirculating fuel between the start pump and the selector valve; and
      in the start mode, the low pressure centrifugal pump supplies fuel at the boosted pressure to the start pump for onward supply to the fuel metering unit, and the fuel supply from the low pressure centrifugal pump to the high pressure centrifugal pump is shut off such that the high pressure centrifugal pump runs dry.

2. The fuel pumping unit according to claim 1, wherein the high pressure centrifugal pump is driven at a higher speed than the low pressure centrifugal pump.

3. The fuel pumping unit according to claim 1, wherein the gear arrangement includes a bevel gear drive.

4. The fuel pumping unit according to claim 1, further having an axial flow inducer at an inlet to the low pressure centrifugal pump.

5. The fuel pumping unit according to claim 1, wherein rotation axes of the low pressure centrifugal pump and the high pressure centrifugal pump are inclined relative to each other.

6. The fuel pumping unit according to claim 1, wherein the low pressure centrifugal pump and the start pump are driven at the same speed by the drive input.

7. The fuel pumping unit according to claim 1, wherein the fuel pumping unit is suitable for pumping fuel for an aero-engine.

8. An aero-engine having the fuel pumping unit according to claim 1.

* * * * *